United States Patent [19]
Glenn

[11] 3,768,260
[45] Oct. 30, 1973

[54] MANIFOLD THERMAL REACTOR

[75] Inventor: Robert G. Glenn, Pittsburgh, Pa.

[73] Assignee: Westinghouse Electric Corporation, Pittsburgh, Pa.

[22] Filed: Aug. 13, 1971

[21] Appl. No.: 171,684

[52] U.S. Cl................ 60/324, 23/277 C, 60/282, 181/40
[51] Int. Cl............................................. F01n 3/08
[58] Field of Search................... 60/282, 322, 323; 23/277 C; 181/40, 67, 53

[56] References Cited
UNITED STATES PATENTS
3,261,161  7/1966  Sawyer.................................. 60/303
3,581,494  6/1971  Scheitlin............................... 181/40

FOREIGN PATENTS OR APPLICATIONS
387,584  2/1933  Great Britain....................... 181/67
413,967  7/1934  Great Britain....................... 60/298

Primary Examiner—Douglas Hart
Attorney—A. T. Stratton et al.

[57] ABSTRACT

A manifold thermal reactor is disclosed having a twisted ribbon core forming a double helical flow path. The helix is positioned within the manifold so that the inlet ports all feed into the same continuous chamber, the end of the helix at the exhaust system port being closed while the opposite end of the helix is opened, whereby the gases entering the reactor travel in the same chamber to the open end of the helix where the gas flow is reversed, thereby causing the gases to enter the other chamber formed by the double helix which directs the flow of gases axially of the manifold to the exhaust system port.

9 Claims, 2 Drawing Figures

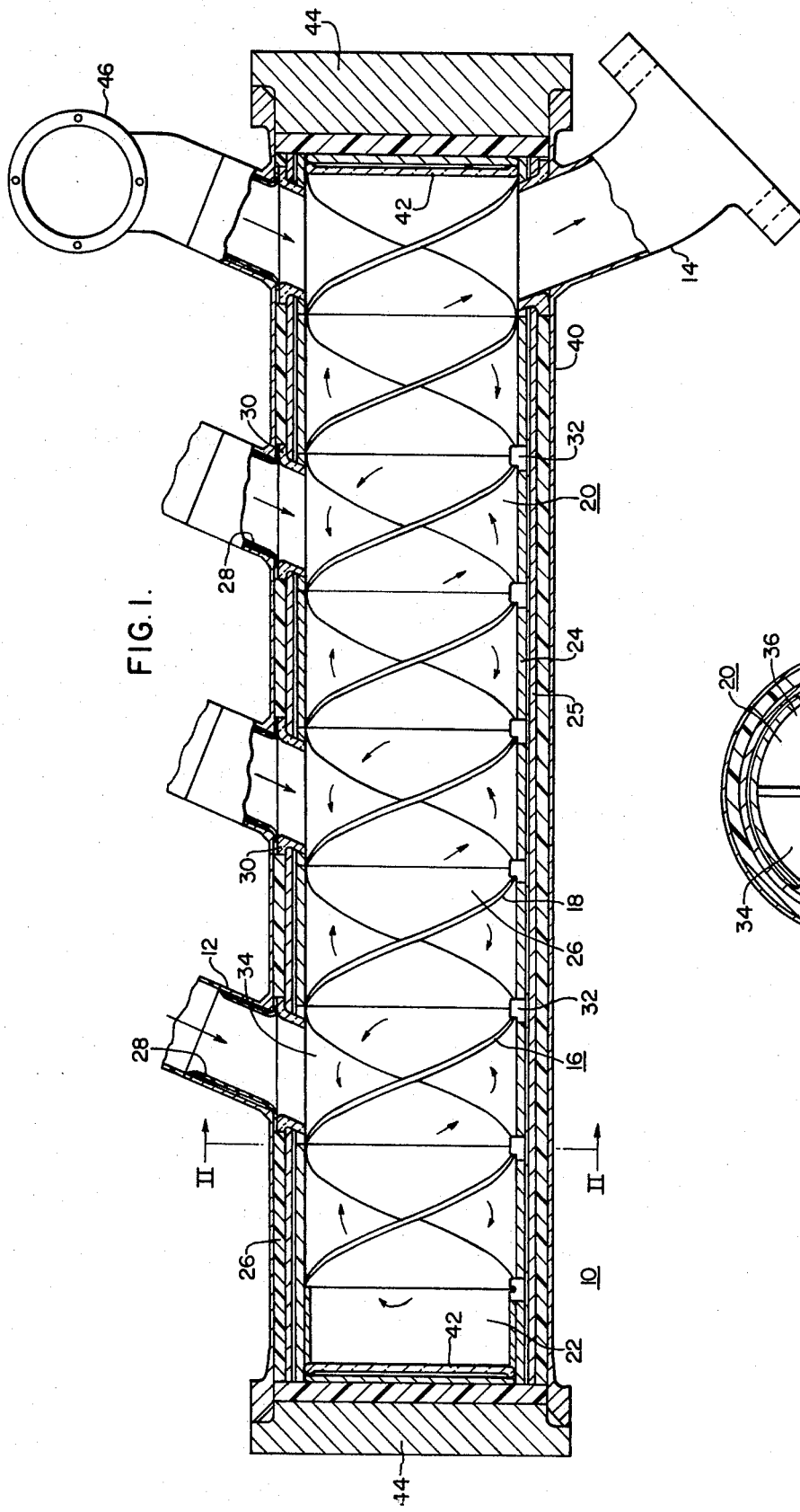
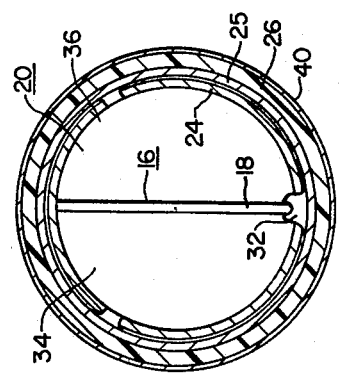

MANIFOLD THERMAL REACTOR

BACKGROUND OF THE INVENTION

This invention pertains in general to an exhaust manifold reactor and more particularly to such a reactor having a twisted ribbon core forming a double helical flow path.

In an internal combustion engine a simple undivided manifold is characterized by cross flows which absorb and waste energy. Individual exhaust passages, if of sufficient length, avail of the kinetic energy of the flowing exhaust gases to reduce the final cylinder pressure. Furthermore, ecological needs require that the exhaust gases be kept at a high enough temperature for a long enough period of time for the gas to be thermally oxidized forming carbon dioxide and water.

An exhaust manifold reactor is a device which meets these ecological requirements and replaces the standard exhaust manifold of an internal combustion engine. Air is injected immediately downstream of the engine exhaust valves. This mixture enters the reactor where the gases are kept at a high enough temperature for the required period of time for the gases to be thermally oxidized forming carbon dioxide and water. Prior designs have not been able to produce a compact unit which provides a long enough flow path for the required oxidation and protects against the high temperature environment and corrosive gases encountered to achieve adequate reactor life.

SUMMARY OF THE INVENTION

In order to overcome the disadvantages of the prior art, this invention provides a new exhaust manifold reactor having a twisted ribbon core forming a double helix. The helix is positioned within the exhaust manifold so that the inlet ports all feed into the same continuous chamber, the end of the helix at the exhaust system port being closed while the opposite end of the helix is open, whereby the gases entering the reactor travel in the same chamber to the open end of the helix where the gas flow is reversed, thereby causing the gases to enter the other chamber formed by the double helix which directs the flow of gases axially of the manifold to the exhaust system port.

The reactor core, thus described, is constructed out of a non-metallic material to protect against the high temperature environment and corrosive gases encountered.

BRIEF DESCRIPTION OF THE DRAWINGS

For a better understanding of the invention, reference may be had to the preferred embodiment, exemplary of the invention shown in the accompanying drawings, in which:

FIG. 1 is a longitudinal sectional view of an exemplary exhaust manifold thermal reactor; and FIG. 2 is a cross-sectional view of the manifold illustrated in FIG. 1 taken along the lines II—II thereof.

DESCRIPTION OF THE PREFERRED EMBODIMENT

An exhaust manifold thermal reactor is a device which receives exhaust emissions from the combustion chamber of an internal combustion engine and replaces the standard exhaust manifold now in use. The manifold thermal reactor provides a high temperature chamber in which hydrocarbons and carbon monoxide are thermally oxidized to form carbon dioxide and water. The new compact manifold design contemplated by this invention includes a helical core for providing a double helical flow path within the manifold chamber which collects the gases from the inlet ports and circulates them through the chamber to the exhaust system port with a minimum amount of parts.

An exemplary embodiment of the reactor contemplated by this invention may be found by reference to FIG. 1 which shows an exhaust manifold housing 10 having inlet and outlet ports 12 and 14, respectively, and a twisted ribbon core 16, forming a double helix. The twisted ribbon core 16 is positioned within the exhaust manifold chamber 20 so that the inlet ports 12 all feed into the same continuous chamber defined by the helicoidal vanes 18 of the core 16. The end of a helix at the exhaust system port 14 being closed while the opposite end of the helix is opened to form a plenum 22, whereby the gases entering the reactor through the inlet ports 12 travel in the same chamber to the open end of the helix where the gas flow is reversed in the plenum 22, thereby causing the gases to enter the other chamber formed by the double helix which directs the flow of gases axially of the manifold chamber 20 to the exhaust system port 14.

The exhaust manifold reactor with a helical ribbon core, thus illustrated, more particularly includes an outer casing 40 manufactured from a corrosive resistant material such as ceramic or stainless steel, lined with insulating packing 26, two concentric cylinders 24 and 25 also manufactured from a corrosive resistant material such as stainless steel having dead space between them, and a core 16. The core 16 is a twisted ribbon, forming a double helix. There are four equally spaced inlet ports 12 and one exhaust port 14 shown, though it is to be understood that the number of inlet ports may vary depending upon the number of combustion chambers 46 within the internal combustion engine to which the manifold is to be adapted. All of the internal parts can be constructed out of a high temperature ceramic such as silicon carbide. While the cylindrical housing illustrated in FIG. 1 is of circular cross-section, it should be understood that this invention is not limited to such a housing and cylindrical is defined herein as including any tubular member regardless of the geometrical shape of its cross-section.

All the inlet ports 12 communicate with the same helical chamber 34 formed by the core 16. Thus, exhaust gas is mixed as it travels through the helical chamber 20 toward the end of the chamber away from the exhaust port 14. The core is stopped short of the end of the cylinder to form a plenum 22 connecting the two sides of the helix 16. The exhaust enters the return helical chamber 36, which communicates with the exhaust port 14 at the opposite end. The extended residence time of the exhaust gas within the manifold enhances the desired combustion of the hydrocarbons.

The inlet ports 12 are lined with high temperature metal tubes 28 with space desirably provided between the tubes and the outer walls of the ports 12 to reduce through the ports. Ceramic to metal seals are avoided and flexibility is provided with ceramic port sleeves 30. The inlet ports 12 desirably enter the reactor tangentially and at the same angle as the helix. This reduces the inlet gas impingment on the actual core materials, thus reducing erosion. The outer casing 25, is lined with high temperature packing 26 which acts as an insulator, and cushion. The packing is retained by the outer tube 40, which may be constructed out of a ceramic such as silicon carbide and runs the full length of the chamber.

In one exemplary embodiment the core 16 is composed of short sections of twisted silicon carbide ribbon sized to equal pitch of the helix. Each helical section is inserted into a corresponding silicon carbide tube 24, of equal length, having semicircular notched ends for coupling. When the tubes are butted together, adjacent notches form corresponding holes, which are fastened by silicon carbide pins 32. The shank of each pin is slotted so that it forks the helical section 18. The retainer pins serve several purposes in orienting each section of the short tubes 24 to form the helix 16 and acting as a spacer between the full-length outer tube 25 and the inner tube 24. Flat plates 42, desirably constructed out of a ceramic such as silicon carbide, close off the end of gas chamber. Packing placed between the end plates 42 and the cylinder end cover 44 functions to provide additional insulation and damping. Penetrations through the outer cylinder and the inner cylinders are aligned with the exhaust ports 12 to allow the gas to enter the reactor chamber. Silicon carbide sleeves 30 are inserted into the penetrations to duct the flow. These sleeves protect the packing insulation, allow for differential motion, and close off the space between the outer cylinder 25 and the inner cylinders 24. The internal parts are protected from mechanical shock by the surrounding packing 26. The packing at the ends provides a resilient snugging together axially of the core pieces. This permits radial fits to be loose enough to prevent binding and breakage from thermal expansion. All ceramic pieces are of a constant core section to reduce thermal stresses. The helical core 16 is made of short lengths to ease manufacture and to eliminate bending. In an alternate embodiment the helical core may be constructed out of a single piece, inserted into a single inner tube 24, to promote ease in assembly.

FIG. 2 shows a cross sectional view of the manifold illustrated in FIG. 1, taken along lines II—II thereof. From this view it can be observed that the helical vanes 18 are affixed to the inner cylinder by means of mounting pin 32 and are positioned in intimate contact with the inner cylinder walls to partition the chamber 20 into a first and second helical chamber 34 and 36, for the inlet flow and outlet flow of the gases, respectively.

In the system thus described, heat loss to the engine compartment is reduced by the two concentric cylinders 24 and 25 with dead space between them and a layer of packing 26 outside the tubes. Good mixing is achieved by the discharge from each exhaust port 12 impinging on the discharge from the other ports 12. The length of the gas flow path is increased by the fact that the exhaust gases must flow in the double helix while flowing axially providing a long enough time for the gases to be thermally oxidized. Furthermore, the provision of a twisted ribbon core composed of a ceramic material achieves adequate long life, and in one embodiment, enables single unit construction thereby simplifying manufacturing procedures.

I claim as my invention:

1. A manifold comprising:
   a cylindrical casing enclosed at both ends forming an elongated chamber;
   a divider plate having a central core with helicoidal vanes subdividing the interior of said chamber, and partitioning one end of said chamber, said dividing plate extending transversely through said chamber and cooperating to form an open plenum at the other end thereof so as to form a double helicoidal chamber having first and second flow paths, said flow paths being communicably coupled at said plenum;
   an inlet port extending through the wall of said casing and communicably coupled to said first helicoidal flow path; and
   an outlet port extending through the wall of said casing positioned substantially at the partitioned end of said chamber and communicably coupled to said second helicoidal flow path.

2. The manifold of claim 1 including a plurality of said inlet ports transversely spaced along and extending through the wall of said chamber and communicably coupled to said first helicoidal flow path.

3. The manifold of claim 1 wherein the wall of said chamber is insulated.

4. The manifold of claim 3 wherein said casing comprises a doubled wall cylinder having dead space therebetween with insulation positioned around the wall thereof.

5. The manifold of claim 1 wherein said divider plate is constructed from a ceramic material.

6. The manifold of claim 1 wherein said cylindrical casing is constructed from a ceramic material.

7. The manifold of claim 1 wherein said cylindrical casing is constructed from stainless steel.

8. An internal combustion engine having a combustion chamber with an exhaust connection communicating with a manifold comprising:
   a cylindrical casing enclosed at both ends forming an elongated chamber
   a divider plate having a central core with helicoidal vanes subdividing the interior of said chamber and partitioning one end of said chamber, said divider plate extending transversely through said chamber and cooperating to form an open plenum at the other end thereof so as to form a double helicoidal chamber having first and second flow paths, said flow paths being communicably coupled at said plenum;
   an inlet port extending through the wall of said casing and communicably coupling the exhaust connection to said first helicoidal flow path; and
   an outlet port extending through the wall of said casing positioned substantially at the partitioned end of said chamber and communicably coupled to said second helicoidal flow path.

9. The manifold of claim 1 wherein said inlet port is angularly positioned and aligned coextensive with said first helicoidal flow path to provide a gas flow channel substantially parallel thereto.

* * * * *